June 22, 1954 L. W. BOOTHBY 2,681,999

COAXIAL RESONANT CIRCUIT

Filed Oct. 25, 1945

5 Sheets-Sheet 1

Inventor

LAWRENCE W. BOOTHBY

By Ralph L. Chappell

Attorney

Inventor
LAWRENCE W. BOOTHBY

By Ralph L Chappell

Attorney

June 22, 1954 L. W. BOOTHBY 2,681,999

COAXIAL RESONANT CIRCUIT

Filed Oct. 25, 1945

5 Sheets-Sheet 3

SPURIOUS RESPONSES OF TYPICAL UNSTRAPPED CONVENTIONAL BUTTERFLY CONDENSER CIRCUIT

Inventor

LAWRENCE W. BOOTHBY

By Ralph L Chappell

Attorney

SPURIOUS RESPONSE ELIMINATION PRODUCED BY STRAPPING EDGES OF ROTOR PLATES OF TYPICAL CONVENTIONAL BUTTERFLY CONDENSER CIRCUIT.

Inventor
LAWRENCE W. BOOTHBY

By Ralph L Chappell

Attorney

June 22, 1954 L. W. BOOTHBY 2,681,999

COAXIAL RESONANT CIRCUIT

Filed Oct. 25, 1945 5 Sheets-Sheet 5

Inventor

LAWRENCE W. BOOTHBY

By Ralph L Chappell

Attorney

Patented June 22, 1954

2,681,999

UNITED STATES PATENT OFFICE 2,681,999

COAXIAL RESONANT CIRCUIT

Lawrence W. Boothby, Alexandria, Va.

Application October 25, 1945, Serial No. 624,612

6 Claims. (Cl. 250—40)

(Granted under Title 35, U. S. Code (1952), sec. 266)

This invention relates to a novel form of ultra-high-frequency circuit, having a variable frequency of resonance controlled by rotary means, particularly suitable for use in wave meters and other devices employing resonant circuits.

So-called "butterfly" circuits are well known in the ultra-high-frequency range. See, for example, "The General Radio Experimenter," volume XIX, No. 5, October 1944, article entitled "The butterfly circuit" by Edward Karplus, and "Proceedings of the I. R. E.," July 1945, pages 426–441, entitled "Wide-range tuned circuits and oscillators for high frequencies" by Edward Karplus. However, it has been found that the conventional "butterfly" circuit may produce spurious responses. The spurious responses can be minimized by bonding the edges of the rotor plates together and bonding the edges of the stator plates together, such bonding being termed "strapping." However, such strapped butterfly circuits are limited in their rotation to 90 degrees.

By providing a novel form of butterfly circuit, the limitations and difficulties of the prior art, above mentioned, have been overcome and certain advantages ensue.

Accordingly, it is an object of this invention to provide an ultra-high-frequency resonant circuit, the frequency of resonance of which may be continuously varied through a rotation of 360° more or less.

It is another object of this invention to provide a circuit without sliding contactors, the frequency of which may be cyclically varied by means of a continuously rotating shaft.

It is another object of this invention to provide a novel resonant circuit in an ultra-high-frequency range having a large ratio of maximum to minimum frequency of resonance.

It is another object of this invention to utilize a novel circuit in the construction of an absorption wave meter to operate in the ultra-high-frequency range.

It is still another object of this invention to utilize a novel resonant circuit in oscillating circuits of many types including ultra-high-frequency receivers and transmitters, and as oscillators for other purposes.

Other and further objects and advantages of this invention will be apparent from the following description, the appended claims, and the accompanying drawings, which are included and form part of this specification.

Preferred embodiments only of this invention have been chosen for purposes of illustration and description and are shown in the accompanying drawings showing a part of the specification in which.

Figure 1:
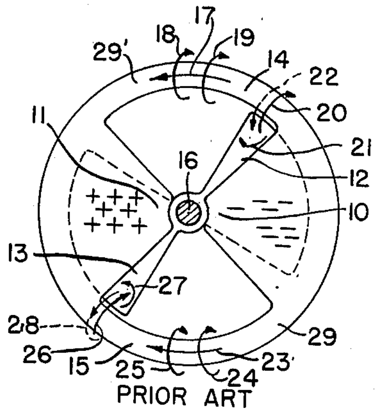
Fig. 1 is a diagram illustrating a typical butterfly circuit.

Referring now to Fig. 1, there is shown a conventional butterfly circuit. The butterfly circuit comprises two or more sets of plates, generally indicated as 10 and 11, occupying sectors radially about an axis normal to the plane of the plate. The axis referred to is the axis of the shaft 16. Connections, for example, to the grid and the plate of an oscillator tube may be made from the two sets of plates 10 and 11; output may be obtained through electromagnetic coupling by positioning a loop in the vicinity of 29 or 29′. Interleaved with the sets of plates 10 and 11 and insulated from with respect to the sets of plates is a rotatable set of plates 12 and 13, which can be moved into or out of the spaces between the plates 10 and 11. Connecting and supporting members 14 and 15, which serve as connecting inductances, are arranged around an outer perimeter between the sets of fixed plates 10 and 11.

When the butterfly circuit is serving as an ultra-high-frequency resonant circuit, the high-frequency current circulates from one set of plates to the other set of plates, 10 to 11, alternating back and forth rapidly along the perimetrical conducting paths 14 and 15. The current is indicated at 17 and 23, instantaneously, for the particular instant during which the current is directed from plate 10 to plate 11. The alternating currents, flowing through inductors 14 and 15, indicated by arrows 17 and 23 at a particular instant, set up rapidly reversing magnetic fields 18, 19, 20, and 24, 25, 26 respectively, which circle the path of the perimetrical inductors 14 and 15, thereby producing the inductance effect. Now, as the rotatable plates 12 and 13 are revolved out of the interleaving space between the fixed set of plates 10 and 11, the rotatable plates 12 and 13 then move into open sector-shaped spaces between the fixed plates 10 and 11 and thereby interpose a conducting metal sheet into a portion of the open space in the sectional area formerly cut by the magnetic fields 18, 19, and 20, and 24, 25 and 26. In Fig. 1 the rotatable set of plates 12 and 13 are shown cutting the magnetic lines of force 20 and 26 respectively, the rotatable sets of plates having moved partially into the open sectorial spaces. The rapidly reversing magnetic fields 20 and 26, surrounding the perimetric conductors 14 and 15 respectively, now pass through the metal sheets of the interposing rotatable plates interposed into the sectional area, thereby causing eddy currents 21 and 27 to flow in the sheets 12 and 13 respectively. The eddy currents 21 and 27 set up opposing magnetic fields 22 and 28 respectively, which tend to cancel out the magnetic fields 22 and 26 respectively, set up by that portion of the inductors whose magnetic field is intersected by the interleaving plates. As a result, the inductances of the perimetric inductors 14 and 15 are reduced in proportion to the reduction of the open sectorial area by the interposition of the rotatable plates. Simultaneously with the reduced inductance, the withdrawal of the rotatable plates from between the interleaving spaces in the fixed set of plates 10 and 11 causes the effective capacitance between points 10 and 11 to be reduced, since the amount of facing area between the rotatable sets of plates and the fixed sets of plates, where these plates are interleaved, is reduced as the rotatable sets of plates are withdrawn. The result is that the value LC of the resonant circuit is also reduced.

Figure 2:
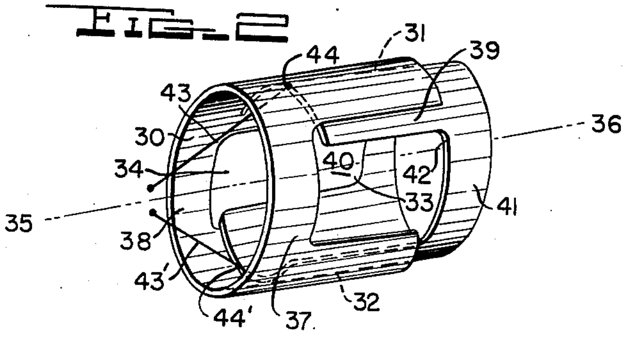
PRIOR ART FIG. 2
Fig. 2 is a perspective view of the original form of this invention.

From the equation:

$$f=\frac{1}{2\pi\sqrt{LC}} \qquad (1)$$

it follows that the maximum resonant frequency is obtained when the device has minimum capacity and minimum inductance, that is, $L_{min.}$, $C_{min.}$ and vice versa. The ratio of maximum to minimum frequency of resonance is much greater with this type of circuit than with a circuit in which C or L alone may be varied. This is true because the ratios of $C_{max.}$ to $C_{min.}$ and the ratio of $L_{max.}$ to $L_{min.}$ are neither as great as the ratio of $L_{max.}$, $C_{max.}$ to $L_{min.}$, $C_{min.}$ Referring now to Fig. 2, there is shown a preferred embodiment of this invention comprising two interleaved cylinders 30 and 41 concentric about the axis 35—36. It will be understood that while only two interleaved cylinders are shown in Fig. 2, that alternately a plurality of cylinders may be employed in tandem, actuated by the same shaft and interleaved in a similar manner. Cylinder 30 or cylinder 41 may either be fixed or rotatable, or both may be rotatable in different amount, to obtain the desired variation in the frequency of resonance. In general, it may be stated that cylinders 30 and 41 are to be so mounted that they may be moved so as to vary the relative angle between them. The cylinder 30 is cut away in U-shaped areas generally indicated as 34 and 40, and cylinder 41 is cut away in areas generally indicated as 33 and 42. By providing interleaved cylinders cut away in the manner generally indicated in Fig. 2, there is provided a set of plates 31 and 32 arranged on an inner cylindrical surface 41 interleaved with a second cylinder 30, which is similarly constructed, and joined by conductors 37 and 38 arranged on the same cylindrical surface 30. However, the U-shaped areas on cylinder 30, that is, areas 34 and 40, are opposed in direction to the U-shaped areas 33 and 42 on cylinder 41. In the Fig. 2, connections are made by means of conductors 43, 43′ connected to the points 44 and 44′ on the inner cylinder 41. Ordinarily in this case the inner cylinder will be the stator and the outer cylinder the rotor. It will be understood, however, that the connection shown could be equally well made to the outer cylinder in a similar position and then the inner cylinder could be the rotor and the outer cylinder the stator.

The electrical functioning of the device illustrated in Fig. 2 is similar to that shown and described in connection with Fig. 1, and the operation thereof will be understood by a consideration of the theory described in connection with Fig. 1. Certain advantages arise, due to effectively "strapping" the rotor, from the cylindrically disposed construction of the device shown. For example, in Fig. 2 unusual and unexpected results are being obtained from the embodiment of the present invention illustrated there.

Figure 3:
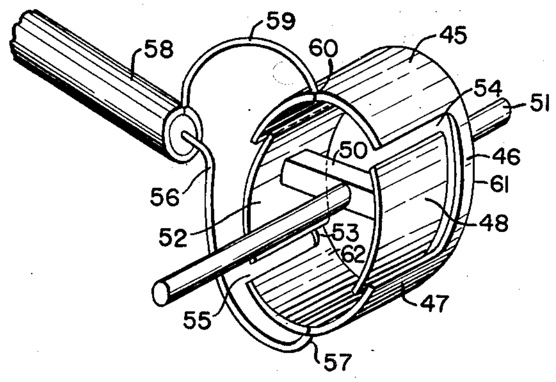
Fig. 3 is a perspective view of another embodiment of this invention.

Fig. 3 is an alternate version of the coaxial butterfly circuit. A device constructed in accordance with Fig. 3 has been experimentally shown to operate as a series resonant circuit between 1250 and 280 megacycles, that is, a frequency ratio of approximately 4.5 to 1. Another device of this kind, somewhat larger and of somewhat slightly different proportion, has experimentally shown a tuning range of 650 to 105 megacycles (see Fig. 8). In the latter case, the ratio of 6.2 to 1 makes the device particularly useful for wave meter applications. Conventional butterfly elements covering this frequency range, which are also entirely reliable in terms of spurious responses, have not been obtainable.

For the sake of simplicity, the elements shown in Figs. 2 and 3 are shown devoid of physical support, although it will be understood that a suitable shaft, insulating supports, bearings, and the like, common in the art, may be employed to suitably position and control the relative orientation of the elements 30 and 41, etc. The shaft supporting the rotor may be interconnected to a dial or other control means through a cam or other form of mechanical transmission adapted to give a linear, logarithmic, or other desired response curve with relation to the motion of the control dial. Another way of obtaining the desired response curve is to provide suitably shaped plates on the rotor or stator or both.

The design of the devices shown in Fig. 2 and Fig. 3 imposes no limitation on the angle of rotation, yet gives performance comparable to that of a properly "strapped" butterfly circuit. Consequently, the rotor may be turned continuously or intermittently through any angle $(2\pi n \pm \theta)$ radians, where $n$ is an integer and where $\theta$ is any angle, read at a given instant of time, which angle may vary as a continuous or intermittent function of time.

The present invention is suitable for employment in frequency varying circuits and the like where the rotatable plate of the device may be connected to a motor shaft and revolved continuously or intermittently according to any desired prearrangement. The absence of spurious responses within the tuning range of the present invention makes possible the attainment of a smoothly varying frequency which is most desirable for these applications.

Referring again to Fig. 3, another embodiment of the present invention is shown, the stator plates 45, 47 being arranged on a cylindric surface and connected by conductors 53 and 61 arranged on the same cylindric surface. Rotor plates 52 and 48 are supported in spaced relationship to the stator plates by means of the diametrical supporting member 50 which is mounted upon the shaft 51. Diametrical supporting member 50 also serves to interconnect the inner or rotor plates 48 and 52. It will be understood that while a single set of plates is illustrated in Fig. 3 that a plurality of such stator and rotor plates may be employed in tandem, interleaving in a manner similar to that shown. The outer cylinder is cut away in the U-shaped areas 54 and 55. The functioning of the device is similar to that herein described in connection with Fig. 1. Coaxial line 58, having central conductor 56, is connected to the stator plates at 60 and 57 through leads 59 and 56 respectively. The device shown in Fig. 3 differs from the device shown in Fig. 2 mainly in that the cylindrical plate areas 48 and 52 are not interconnected by means of the conductors arranged along a cylinder, but rather by a diametrically arranged conductor. However, the provision of a diametric element having a fixed inductance between floating rotor plates 48 and 52 does not impose a detrimental restriction on the highest frequency which might be obtained, inasmuch as the plates 48 and 52 are substantially decoupled from the plates 45 and 47 when the plates 48 and 52 are revolved fully into the open U-shaped spaces 54 and 55 respectively. When this position is maintained, very little ultra-high-frequency current flows through the diametric inductor element 50, and consequently the effect of this inductance is minimized in the position of maximum frequency response.

While the cutaway areas or apertures described in connection with Figs. 2 and 3 have been described as U-shaped, it will be understood that other aperture shapes may be employed; such as, partially or wholly enclosed apertures, as in Fig. 4.

In another embodiment of this invention, the cylindrical construction herein described in connection with Figs. 2 and 3 may be modified by causing the interleaved elements to be formed of conical or spherically shaped surfaces.

Figure 4:
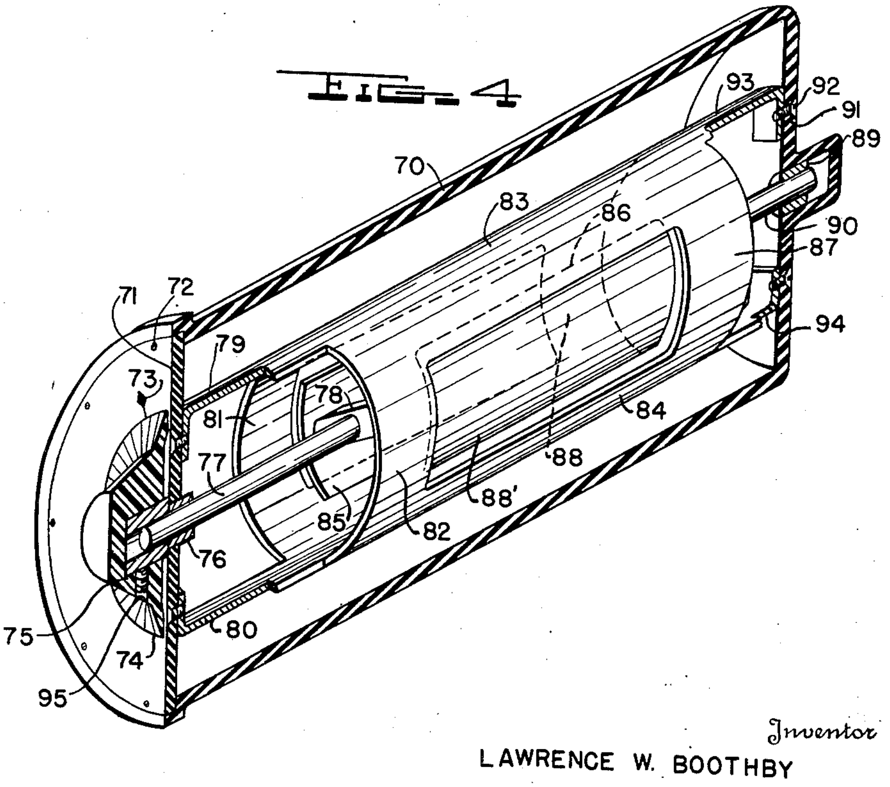
Fig. 4 is a perspective cut-away view of an absorption wave meter embodying one preferred form of this invention.

In Fig. 4 there is shown a novel and useful embodiment of the present invention in the form of an absorption wave meter. When an absorption wave meter is brought into the vicinity of a radiating oscillator circuit, and when the absorption wave meter circuit is tuned to anti-resonance at the frequency of oscillation of the radiating circuit, energy is absorbed and dissipated within the absorption wave meter thereby causing a decrease in the radiation resistance of the oscillating circuit which is manifested by a change in the plate current or grid current in the oscillator circuit.

In Fig. 4, 70 is a dielectric casing molded, for example, of cellulose acetate polystyrene or hard rubber, supporting a panel 71 by means of the screws 72. Mounted on the panel by means of brackets 79 and 80 is a novel form of a cylindrical anti-resonant tank circuit in accordance with one preferred embodiment of this invention, which is particularly suited for operation as an absorption wave meter device. The construction shown is generally similar to that described in connection with Fig. 3, with the exception that the U-shaped open space in Fig. 3 is now enclosed into the form of a rectangle by means of cylindrically disposed conductors 87, 82, 86, and 81.

Shaft 77 is supported by bearings 76 and 89 mounted in the panel 71 and in the insulating support 91 respectively. The insulating support 91 is supported by means of extension members 93, 94 respectively, protruding from and forming a part of the cylinder. Shaft 77 is fastened to the dial 74 by means of a set screw 95. Indicator mark 73 on the panel 71 provides a reference point opposite which the calibrated frequency of anti-resonance corresponding to the position of the rotor may be read. Rotor plates 85 and 88' are supported by means of the diametric supporting member 78 which is mounted upon shaft 77 and which functions in a manner similar to that described in connection with Fig. 3. In operation, the device is brought into the general vicinity of the radiating oscillator, and the dial is rotated until the grid current meter or other indicator of the oscillator shows an abrupt and pronounced change. This indicates that the absorption wave meter is tuned to the frequency of radiation and the frequency may then be read directly on the dial opposite the index mark 73.

Figure 5:
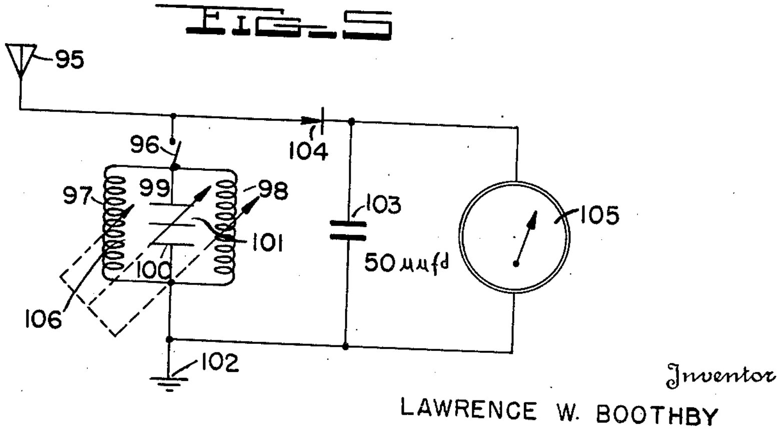
Fig. 5 is a schematic diagram of a direct reading wave meter embodying a second preferred form of this invention.

Referring now to Fig. 5, there is shown an embodiment of the present invention utilized in connection with a direct reading wave meter.

In the schematic diagram the antenna 95 picks up energy from the oscillator and passes it through the crystal rectifier element 104 via the bypass condenser 103 to ground, the rectified D. C. component being measured on the meter 105, which is preferably a microammeter. A series resonant circuit 106 may be constructed according to the Figs. 2, 3, or modification thereof may be switched into or out of the antenna lead by means of switch 96. This circuit 106 is a high impedance, except at the frequency of resonance when it presents a low impedance. Hence, when switch 96 is connected, the meter will dip only when the circuit is tuned to the frequency being received by the antenna.

This particular form of wavemeter has the advantage that the output from an oscillator in the vicinity of the wave meter antenna is shown as an indication on the meter regardless of the frequency of oscillation, when the switch 96 is open. Changing the frequency of the oscillator will change the amplitude of the received signal but it is not necessary to keep resetting the wave meter to see if the oscillator being studied will oscillate over the entire tuning range. Whenever it is desired to measure the frequency of the oscillator, the switch is closed and the tuning dial on the wave meter is adjusted to give a sharp null in the reading of the meter. Frequency may be read directly from the dial which may be accurately calibrated.

A switch may be connected across the meter to decrease its sensitivity and the tuned circuit on-off switch may be directly coupled to the main tuning dial if it is desired to reduce the number of separate adjustments required in the operation of the equipment.

Since there is very little coupling between the oscillator being studied and the wave meter, normal operating conditions of the oscillator are more nearly simulated by this method than by other frequency measuring means.

The devices herein described have the advantages of being compact and simple in construction as well as providing efficient operation over a wide range in the ultra-high-frequency spectrum.

Figure 6:
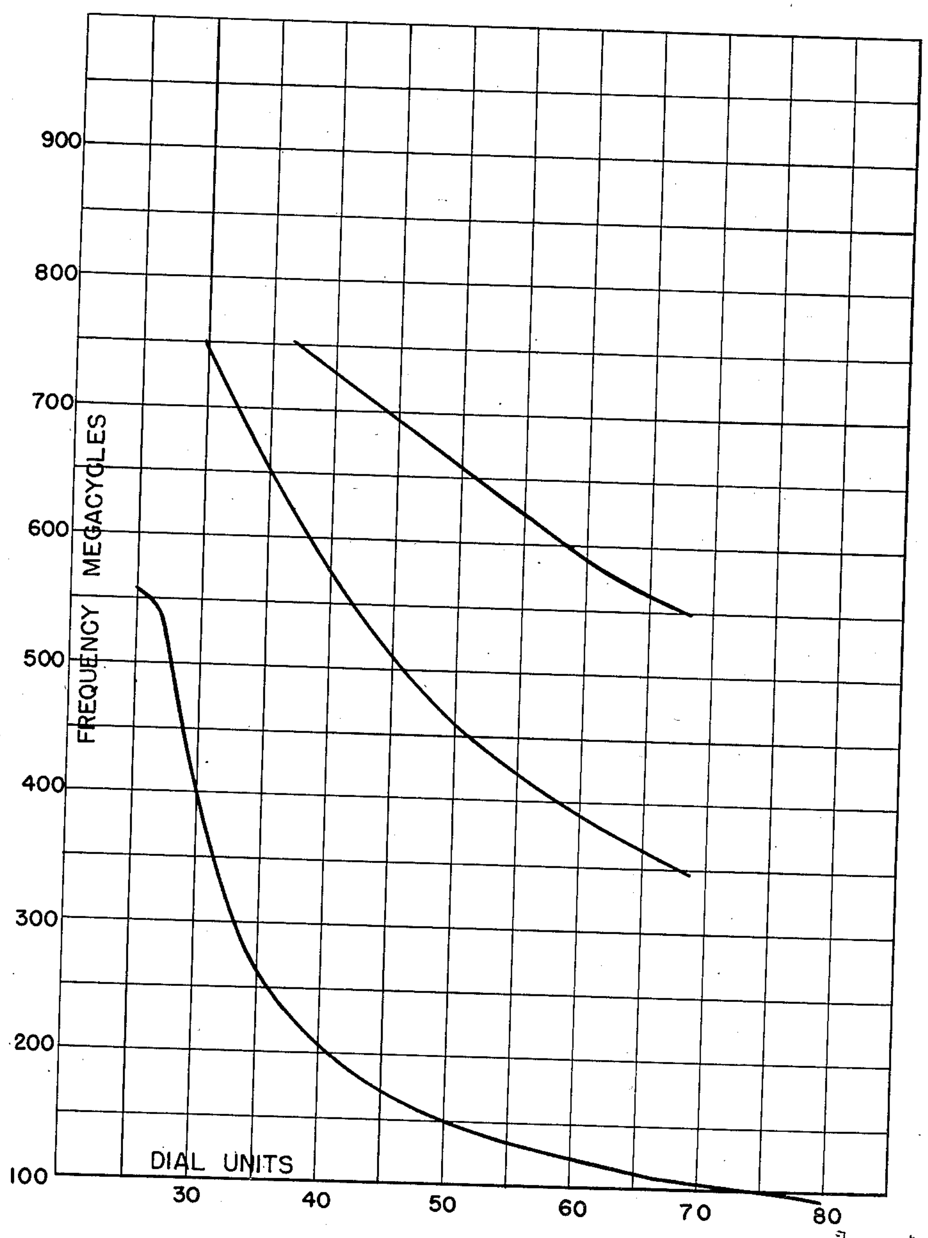
Fig. 6 is a graph showing the relation between the resonant frequency and the dial reading on a conventional butterfly type of circuit.
Figure 7:
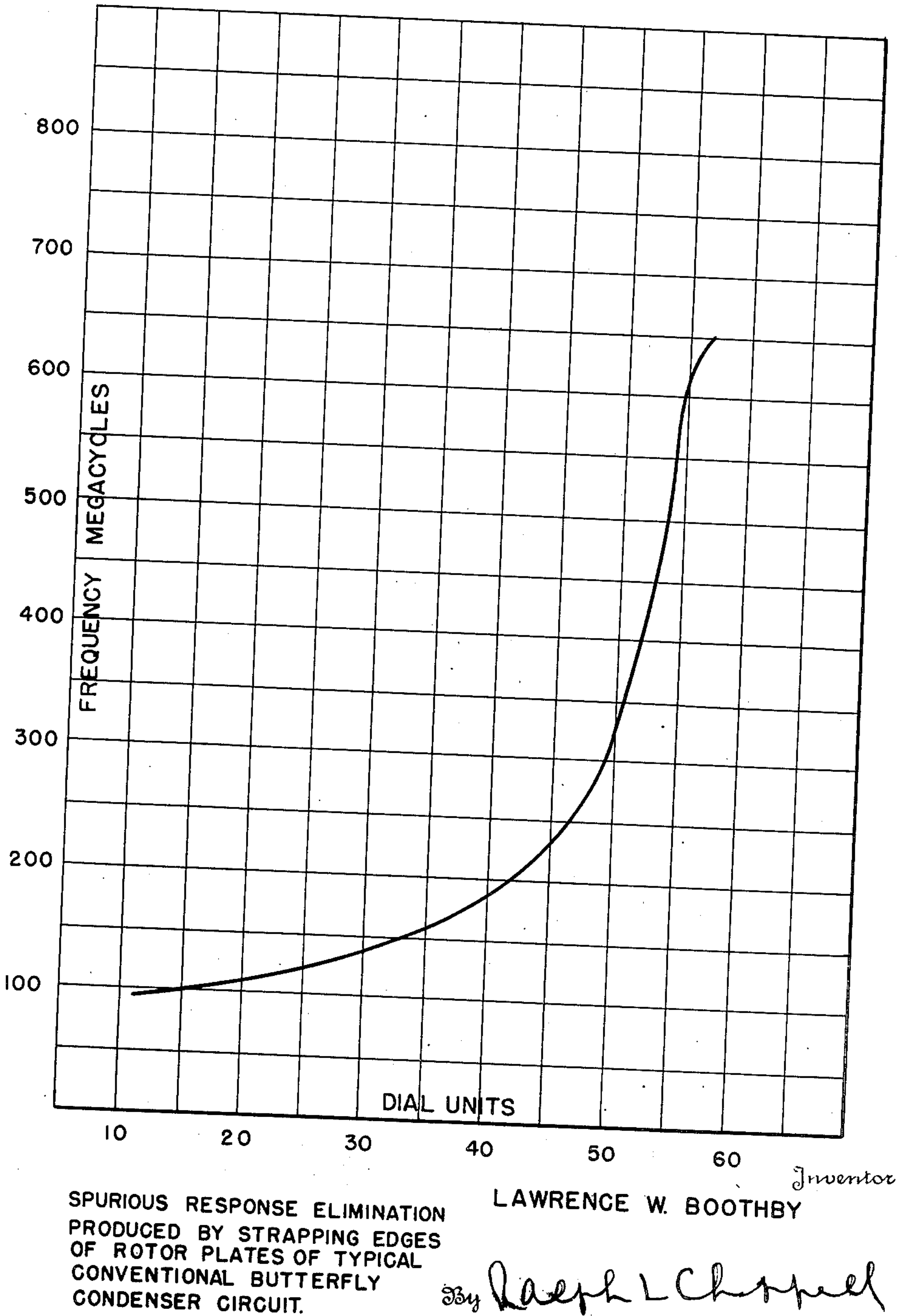
Fig. 7 is similar to Fig. 6; however, in this case the butterfly circuit has been strapped to minimize spurious responses.
Figure 8:
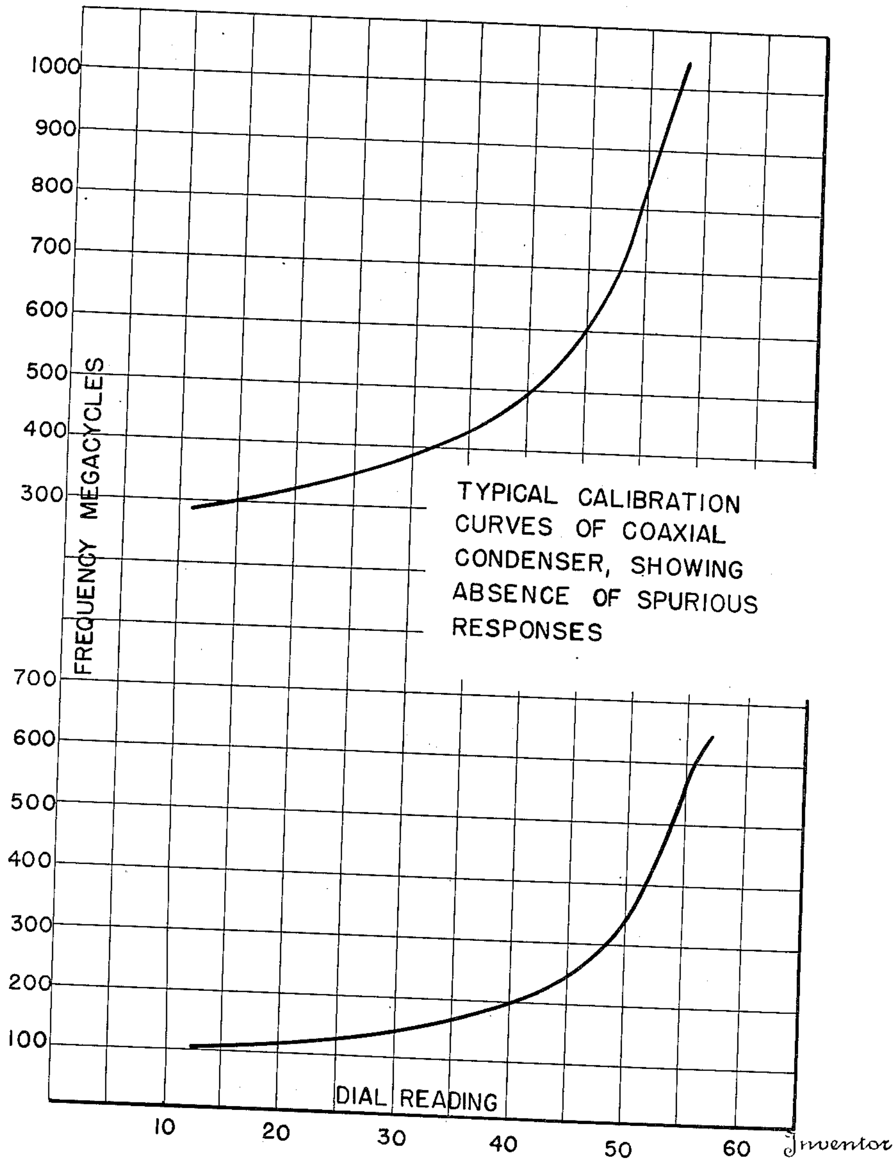
Fig. 8 is a graph showing the relation between the spurious resonant frequency and the dial reading on two devices according to the present invention, for example, as illustrated in connection with Fig. 3, showing freedom of spurious responses throughout the tuning ranges.

Referring to Fig. 6, there is shown a calibration of a conventional unstrapped butterfly condenser circuit such as shown in Fig. 1. The curves were obtained with a device of this kind whose rotor plates were insulated from each other. Particular reference is made to the plurality of spurious responses obtained with this device. Referring to Fig. 7, there is shown another calibration curve of a similar condenser to that tested in connection with Fig. 6, in which the spurious responses have been eliminated by strapping the edges of the rotor plates. However, in so doing rotary motion has been restricted to approximately 90°. Referring to Fig. 8, there are shown typical calibration curves of coaxial condensers according to this invention such as shown in Fig. 3, in which spurious responses are eliminated without imposing restrictions on rotary motion.

While the devices herein described, and the forms of apparatus for their operation, constitute preferred embodiments of the invention, it is to be understood that the invention is not limited to these precise devices and forms of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. An ultra high frequency resonant circuit comprising: a capacitor including a first set of arcuate shaped conductors angularly disposed about a longitudinal axis to form segments of a first hollow, open-ended cylinder and a second set of arcuate shaped conductors angularly disposed about said longitudinal axis to form segments of a second hollow, open-ended cylinder in coaxial relationship to said outer cylinder; inductance means including cylindrical annular conductive means connecting together said first set of arcuate shaped conductors at least at one end thereof, and conductive means connecting together said second set of conductors, the second set of conductors being rotatable relative to the first set so that the individual conductors of said second set may be positioned to intercept magnetic lines of flux surrounding said inductance means, one of said sets of conductors being disposed within the other of said sets, and energy input means coupled to a pair of said first set of conductors.

2. An ultra high frequency resonant circuit comprising: a capacitor including a first set of arcuate shaped conductors angularly disposed about a longitudinal axis to form segments of a first hollow, open-ended cylinder and a second set of arcuate shaped conductors angularly disposed about said longitudinal axis to form segments of a second hollow, open-ended cylinder in coaxial relationship to said first cylinder; inductance means including cylindrical annular conductive means connecting together said first set of arcuate shaped conductors at least at one end thereof, diametric conductive means strapping together said inner set of conductors, one of said sets of conductors being disposed within the other of said sets, and energy input means coupled to a pair of said first set of conductors.

3. An ultra high frequency resonant circuit comprising: a capacitor including a first set of arcuate shaped conductors angularly disposed about a longitudinal axis to form segments of a first hollow, open-ended cylinder and a second set of arcuate shaped conductors angularly disposed about said longitudinal axis to form segments of a second hollow, open-ended cylinder in coaxial relationship to said first cylinder; inductance means including cylindrical annular conductive means connecting together said first set of arcuate shaped conductors at least at one end thereof; a second cylindrical, annular conductive member strapping together said second set of segments at an end thereof opposite said first cylindrical annular conductive means, one of said sets of conductors being disposed within the other of said sets, and energy input means coupled to a pair of said first set of conductors.

4. An ultra high frequency resonant circuit comprising: a first set of conductive strips angularly disposed in spaced relationship about the surface of a first imaginary cylinder, ring shaped conductive means likewise disposed on the surface of said first imaginary cylinder and connecting together said first set of conductive strips at least at one end thereof; a second set of conductive strips adapted to be interleaved with said first set angularly disposed in spaced relationship on the surface of a second imaginary cylinder coaxial with said first imaginary cylinder, one of said sets of conductive strips being adapted to be rotated relative to the other; conductive means electrically connecting together said second set of conductive strips; and energy input means coupled to a pair of said first set of conductive strips.

5. An ultra high frequency resonant circuit comprising: a first set of conductive strips angularly disposed in spaced relationship about the surface of a first imaginary cylinder; ring shaped conductive means likewise disposed on the surface of said first imaginary cylinder and connecting together said first set of conductive strips at least at one end thereof; a second set of conductive strips adapted to be interleaved with said first set angularly disposed in spaced relationship on the surface of a second imaginary cylinder coaxial with said first imaginary cylinder, one of said sets of conductive strips being adapted to be rotated relative to the other; diametric conductive means joining together said second set of conductive strips; and energy input means coupled to a pair of said first set of conductive strips.

6. An ultra high frequency resonant circuit comprising: a first set of conductive strips angularly disposed in spaced relationship about the surface of a first imaginary cylinder, ring shaped conductive means likewise disposed on the surface of said first imaginary open-ended cylinder and connecting together said first set of conductive strips at one end thereof; a second set of conductive strips adapted to be interleaved with said first set angularly disposed in spaced relationship on the surface of a second imaginary cylinder coaxial with said first imaginary open-ended cylinder, one of said sets of conductive strips being adapted to be rotated relative to the other; ring shaped conductive means likewise disposed on the surface of said cylinder connecting together said second set of conductive strips at the end thereof opposite said one end; and energy input means coupled to a pair of said first set of conductive strips.

References Cited in the file of this patent

UNITED STATES PATENTS

| Number | Name | Date |
|---|---|---|
| 1,441,212 | Cardwell | Jan. 9, 1923 |
| 1,651,975 | Specht | Dec. 6, 1927 |
| 1,715,880 | Willhagen | June 4, 1929 |
| 1,919,215 | Gunn | July 25, 1933 |
| 1,921,448 | Baranowsky | Aug. 8, 1933 |
| 1,955,093 | Roosenstein | Aug. 17, 1934 |

| Number | Name | Date |
|---|---|---|
| 2,110,179 | Schmidt | Mar. 8, 1938 |
| 2,189,284 | Fritz | Feb. 6, 1940 |
| 2,232,591 | Davies | Feb. 18, 1941 |
| 2,483,893 | Everett | Oct. 4, 1949 |

OTHER REFERENCES

Q. S. T., July 1941, "A Sensitive Absorption Wavemeter," page 21.

Wide-Range Tuned Circuits and Oscillators for High Frequencies, E. Karplus, Proc. of the I. R. E., July 1945, pages 426–441. Copy in Patent Office Library.

The Radio Amateur's Handbook, 1946 edition, pages 401 and 402.